W. COX.
APPARATUS FOR HANDLING SHAPED MASSES OF INCOHERENT MATERIAL.
APPLICATION FILED JULY 25, 1908.

920,275.

Patented May 4, 1909.
2 SHEETS—SHEET 1.

WITNESSES:

INVENTOR
Walter Cox.
BY
ATTORNEY.

W. COX.
APPARATUS FOR HANDLING SHAPED MASSES OF INCOHERENT MATERIAL.
APPLICATION FILED JULY 25, 1908.

920,275.

Patented May 4, 1909.
2 SHEETS—SHEET 2.

WITNESSES:
Rob. R. Ritchel.
Frank E. Lunch.

INVENTOR
Walter Cox.
BY
Augustus B. Stoughton
ATTORNEY.

UNITED STATES PATENT OFFICE.

WALTER COX, OF PHILADELPHIA, PENNSYLVANIA, ASSIGNOR TO THE TRUST COMPANY OF NORTH AMERICA, TRUSTEE, OF PHILADELPHIA, PENNSYLVANIA, A CORPORATION OF PENNSYLVANIA.

APPARATUS FOR HANDLING SHAPED MASSES OF INCOHERENT MATERIAL.

No. 920,275.  Specification of Letters Patent.  Patented May 4, 1909.

Application filed July 25, 1908. Serial No. 445,438.

*To all whom it may concern:*

Be it known that I, WALTER COX, a citizen of the United States, residing at the city of Philadelphia, in the county of Philadelphia and State of Pennsylvania, have invented certain new and useful Apparatus for Handling Shaped Masses of Incoherent Material, of which the following is a specification.

There are processes for producing building and other material which involve the shaping or molding of relatively incoherent masses such as damp sand mixed with a fusible material and the subsequent heating and consolidation and perhaps other treatment of those molded masses. Such incoherent masses frequently are of comparatively large dimensions; in fact so large that it is practically impossible to get a shovel, scoop or other like tool under them and out from under them without destroying them.

It is the principal object of the present invention to provide apparatus which can be inserted under, withdrawn from under, and used as a means for conveying such relatively incoherent masses without breaking or unduly disturbing their form so that such masses can be placed in and removed from furnaces, presses and other appropriate apparatus.

Figure 1:
Figure 2:
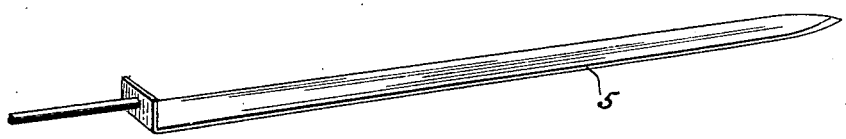
Figure 3:
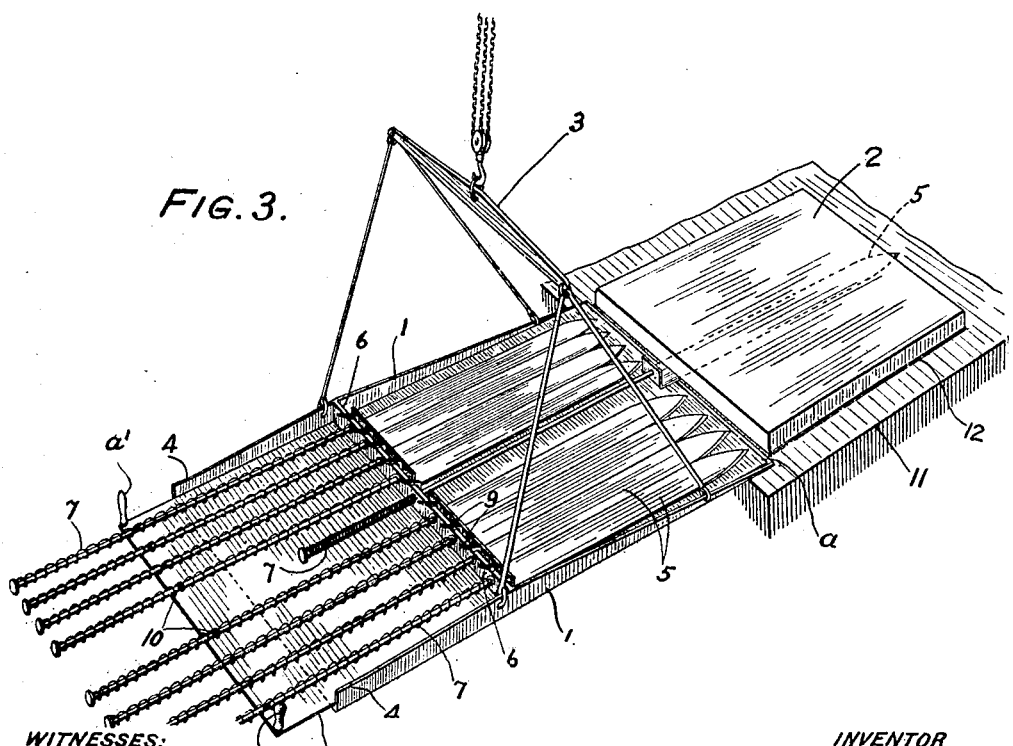
Figure 4:
Figure 5:
Figure 6:
Figure 7:
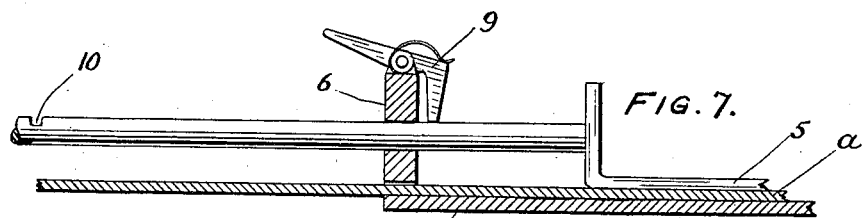
Figure 8:
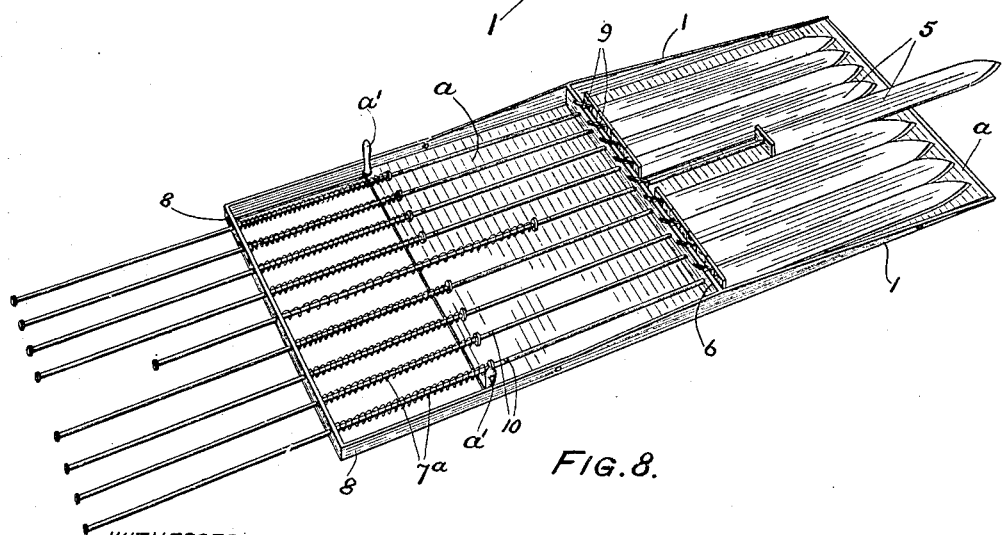

For the sake of a description I have illustrated in the accompanying drawings one embodiment of the invention and in the drawings Figure 1, is a view illustrating a mass of relatively incoherent material molded or formed to pre-determined shape such as my apparatus is adapted to handle. Fig. 2, is a perspective view of a blade or finger which forms part of the apparatus. Fig. 3, is a perspective view illustrating the apparatus. Figs. 4, 5 and 6, are perspective views illustrating fingers or blades embodying modifications of the invention. Fig. 7, is a sectional view drawn to an enlarged scale and illustrating a detail of construction, and Fig. 8, is a perspective view of apparatus embodying a modification of the invention.

In the drawings 1, is a carrier of sufficient rigidity and strength to support the mass 2, of relatively incoherent material. The carrier is shown as provided with suspension means 3, and with handles 4, which, when present, facilitate its manipulation.

$a$, is a scoop slidably mounted in the carrier 1, and it is shown as flat so as to properly support the mass of material 2. The scoop or slide $a$, is shown as provided with handles $a^1$, by which it can be moved in respect to the carrier 1, and the carrier 1, is provided with suitable ways in which the scoop $a$, slides.

5, are blades, fingers or knives slidably arranged on the upper face of the scoop and in the carrier so that they may be caused to lie upon the same or to project from the edge of the scoop. The carrier is shown as provided with a head 6, arranged above the scoop and through which the shanks of the blades or fingers work and by which they are guided. It is frequently desirable to withdraw the blades or fingers rapidly from under the mass 2, and for this purpose springs 7, may be provided. As shown in Fig. 3, these are compression springs and they are interposed between the head 6, and the ends of the shanks of the blades or fingers. As shown in Fig. 8, the springs $7^a$, are arranged as tension springs and they are connected with the shanks of the fingers or knives and with an extension 8, at the rear of the carrier.

9, are detents or catches shown as pivoted to the head 6, and they are adapted to engage the blades or fingers and detain them as by taking into notches 10. The ends of the blades or finger may be variously shaped and several forms are shown in Figs. 2, 4, 5, and 6. It will thus be understood that the scoop or slide $a$, and the fingers 5, are relatively movable and when the carrier 1, is present each of these parts is movable in respect to it.

To describe the mode of operation of the apparatus reference will be made to its use in connection with the preparation of the building material of the general kind referred to above, but the apparatus may of course be used in connection with other material. The molded mass 2, is shown as resting upon a support 11, and in order to pick it up the carrier 1, is placed in the general position indicated in Fig. 3. The blades or fingers 5, are then pushed under the mass 2, either singly or in groups, or all together. To facilitate the passage of the fingers the more or less coherent mass 2, may be placed upon a layer as of sand 12, and if necessary, upon wire netting 13, so that the fingers may displace the layer of sand and pass under the wire netting or other suitable material 13, without disturbing the mass 2. The pointed ends of the fingers as well as the shapes of the points shown facilitate the passage of the fingers under the mass 2, without disturbing it. In other words, it is possible to insert the comparatively slender fingers either one after another or perhaps several at a time beneath the mass 2, without disturbing it, whereas it would be impossible to insert the scoop or slide a, directly under the mass. After the fingers have been thus worked under the mass 2, the slide or scoop a, is pushed forward under the fingers and it is sufficiently strong to bear the weight of the mass. As the slide or scoop a, is pushed forward it slides under the fingers and thus the mass 2, is not unduly disturbed. The carrier may now be moved to any convenient position and the mass 2, deposited upon any suitable support. For this purpose the slide with the superposed fingers and mass 2, is deposited on the support. The slide a, is withdrawn and then the fingers are withdrawn. In the case of the arrangement shown, this is accomplished by tripping the catches 9, successively in groups, or all together, so that their springs withdraw the fingers with celerity and their rapid motion tends to prevent their withdrawal from disturbing the mass 2. Of course, if desired, the springs may be omitted and the fingers withdrawn by hand, or in any appropriate way.

What I claim is:

1. Apparatus for handling molded or shaped masses of incoherent material which consists of a slide or scoop, and a series of fingers slidably mounted upon the face of the slide or scoop and adapted to be projected beyond the edge thereof, substantially as described.

2. Apparatus for handling molded or shaped masses of incoherent material which consists of a carrier and a slide or scoop, and a series of blades or fingers movable in respect to each other and each adapted to be projected from the edge of the carrier, substantially as described.

3. In apparatus for handling molded or shaped masses of incoherent material a slide or scoop, fingers or blades adapted to project beyond the edge of the slide or scoop, means for retracting the blades or fingers, and detents for holding the blades or fingers, substantially as described.

4. Apparatus for handling molded or shaped masses of incoherent material which comprises a scoop and fingers slidably mounted on the face of the scoop and provided with pointed ends, substantially as described.

In testimony whereof I have hereunto signed may name.

WALTER COX.

Witnesses:
FRANK E. FRENCH,
S. E. PATTERSON.